United States Patent [19]

Hardison

[11] Patent Number: 4,784,775
[45] Date of Patent: Nov. 15, 1988

[54] REMOVAL OF HYDROGEN SULFIDE FROM SOUR WATER

[75] Inventor: Leslie C. Hardison, Barrington, Ill.

[73] Assignee: ARI Technologies, Inc., Palatine, Ill.

[21] Appl. No.: 20,568

[22] Filed: Mar. 2, 1987

[51] Int. Cl.[4] .............................................. C02F 1/74
[52] U.S. Cl. .................................. 210/712; 60/641.2; 210/718; 210/721; 210/750; 210/763; 423/573.1
[58] Field of Search ............... 60/641.2; 210/712, 718, 210/721, 750, 752, 758, 763, 765; 423/224, 571, 573 R

[56] References Cited

U.S. PATENT DOCUMENTS

| | | | |
|---|---|---|---|
| 3,029,201 | 4/1962 | Brown et al. | 210/59 |
| 4,076,621 | 2/1978 | Hardison | 210/60 |
| 4,189,462 | 2/1980 | Thompson | 423/224 |
| 4,238,462 | 12/1980 | Hardison | 423/224 |
| 4,363,215 | 12/1982 | Sharp | 60/641.2 |
| 4,414,817 | 11/1983 | Jernigan | 60/641.2 |
| 4,451,442 | 4/1984 | Jeffrey et al. | 423/224 |
| 4,468,929 | 9/1984 | Jernigan | 60/641.2 |
| 4,614,644 | 9/1986 | Lampton et al. | 423/226 |
| 4,629,608 | 12/1986 | Lampton et al. | 423/226 |
| 4,696,802 | 9/1987 | Bedell | 210/763 |

OTHER PUBLICATIONS

"1985 Lo-Cat Process Update," L. C. Hardison Rocky Mountain Regional Meeting of the Gas Processors Association, Englewood, Colo., Sep. 26, 1985.

*Primary Examiner*—Peter Hruskoci
*Attorney, Agent, or Firm*—Marshall, O'Toole, Gerstein, Murray & Bicknell

[57] ABSTRACT

Sour water is treated to remove dissolved hydrogen sulfide by means of an aqueous chelated polyvalent metal solution in a continuous recirculating system, particularly an autocirculation system, having reaction and oxygenation zones. The solution contains a small catalytic amount of chelated polyvalent metal, and the dissolved hydrogen sulfide is catalytically oxidized to sulfur in the liquid phase by means of dissolved oxygen in the solution. The sour water feed to the reaction zone is diluted by a massive recycle of oxygenated solution from the oxygenation zone before the sour water is contacted with air or other oxidizing gas used for oxygenating the used solution. A portion of the oxygenated solution containing chelated polyvalent metal is removed as the sweet water product, and replacement chelated polyvalent metal is added. The operating variables are controlled to maintain in the solution a predetermined polyvalent metal content and an effective dissolved oxygen content, and also to maintain a predetermined residence time so as to obtain high efficiency of hydrogen sulfide removal.

17 Claims, 2 Drawing Sheets

REMOVAL OF HYDROGEN SULFIDE FROM SOUR WATER

This invention relates to a novel and improved process and apparatus for the treatment of so-called "sour water" to remove dissolved hydrogen sulfide.

BACKGROUND OF THE INVENTION

Industrial waste water containing dissolved hydrogen sulfide presents a significant pollution problem because of its high toxicity and unpleasant odor even at low concentrations. The treatment of such waste water is necessary before discharging it to the environment so as to reduce the hydrogen sulfide content to acceptable levels. The present invention provides a simple and effective method of removing hydrogen sulfide from such waste water streams.

Typical sour water streams are those produced in oil refineries by water washing of sour liquid hydrocarbons and various cooler and condenser surfaces. Condensation of geothermal steam also produces sour water which requires treatment. Although the present invention may be used for the treatment of any sour water stream regardless of its source, the invention is of particular significance for treating geothermal condensates.

In a geothermal power plant geothermal steam is used to power a steam turbine which is connected to an electric power generator. The exhaust steam from the turbine is supplied to a condenser, and the resultant steam condensate is removed for reuse or discard. Geothermal steam, however, contains dissolved hydrogen sulfide in amounts which may range, for example, from as low as about 5 ppm to as high as about 1600 ppm and typically may average about 150 to 250 ppm. Dependent upon the type of condenser and its efficiency, a significant percentage, e.g., as much as 80%, of the hydrogen sulfide in the geothermal steam will end up as dissolved hydrogen sulfide in the condensate. This sour water stream must be treated to remove hydrogen sulfide in order to avoid environmental pollution.

U.S. Pat. No. 4,076,621 discloses a process for removing hydrogen sulfide from sour water by air stripping the dissolved hydrogen sulfide from the sour water and then scrubbing the air stream with an aqueous solution of chelated iron. U.S. Pat. Nos. 4,414,817; 4,451,442; and 4,468,929 disclose processes for removing hydrogen sulfide from geothermal steam or condensate using an aqueous solution containing at least the stoichiometric amount of a chelated polyvalent metal. U.S. Pat. No. 4,363,215 discloses a process for removing hydrogen sulfide from geothermal steam condensate using hydrogen peroxide and an iron chelate catalyst. U.S. Pat. Nos. 4,614,644 and 4,629,608 disclose processes for removing hydrogen sulfide from geothermal steam using a chelated iron solution and a cationic polymeric catalyst.

However, the known sour water treatment processes that rely on the use of chelated polyvalent metal solutions are complex and have other disadvantages, such as excessive consumption or discard of expensive chelating agent.

A primary object of the present invention is to provide a novel and improved process and apparatus for the treatment of sour water which has important advantages over the processes and systems heretofore proposed.

Another object of the invention is to provide a process and apparatus of the foregoing character which utilize an aqueous catalyst solution of chelated iron or other polyvalent metal in a novel and improved manner such that the cost of lost catalyst is minimal or economically feasible.

BRIEF DESCRIPTION OF THE INVENTION

This invention utilizes a continuous recirculating system having a reaction zone and an oxygenation or reoxidation zone. The sour water containing dissolved hydrogen sulfide is fed to the reaction zone and is immediately mixed and diluted with a massive amount of a freshly oxygenated aqueous catalyst solution of chelated iron that contains dissolved oxygen and has a predetermined relatively low iron concentration that is below the stoichiometric requirement for oxidation of hydrogen sulfide by ferric ion. The dissolved oxygen in the oxygenated catalyst solution is relied upon as the primary oxidant for hydrogen sulfide, and the iron functions primarily as a catalyst for the oxidation reaction. Thereafter, the liquid mixture passes from the reaction zone to the oxygenation zone and is there contacted with air or other oxygen-containing gas.

The combined liquid mixture of catalyst solution and sour water is retained in the system for a relatively long residence time that is correlated with the iron concentration to effect substantially complete liquid phase catalytic oxidation of the dissolved hydrogen sulfide by the dissolved oxygen. The required residence time increases as the iron concentration decreases, and vice versa.

In the oxygenation zone, air or other oxygen-containing gas is bubbled through the liquid mixture to infuse the mixture with dissolved oxygen. A major portion of this liquid mixture is recirculated from the oxygenation zone to the reaction zone and there mixes with and dilutes the incoming sour water feed. The sour water feed is introduced into the system in a manner such that it is not contacted by air or gaseous oxygen until after it has been diluted with the recycle stream from the oxygenation zone and has passed through the reaction zone. Thus, the oxidation of dissolved hydrogen sulfide by dissolved oxygen in the reaction zone occurs entirely in the liquid phase without contact of the liquid with air or gaseous oxygen or other stripping gas capable of stripping the dissolved hydrogen sulfide from the sour water as taught in U.S. Pat. No. 4,076,621.

A minor portion of the liquid mixture is withdrawn from the oxygenation zone as the sweet water product of the process. Since this product contains chelated iron in solution, fresh or replacement chelated iron must be added to the system to maintain the desired iron concentration. Because of the relatively low concentration of the chelated iron on the order of 0.5 ppm to 5 ppm by weight, the cost of the catalyst lost in the sweet water product is minimal so that the process is economically feasible.

The sour water feed rate, the recirculation rate, the product withdrawal rate, the rate of addition of replacement chelated iron, and the sizes of the reaction zone and the oxygenation zone are correlated to maintain the desired iron concentration, the desired dilution of sour water feed, and the desired residence time, as explained in more detail in the following detailed description.

DETAILED DESCRIPTION OF THE INVENTION

Figure 1:
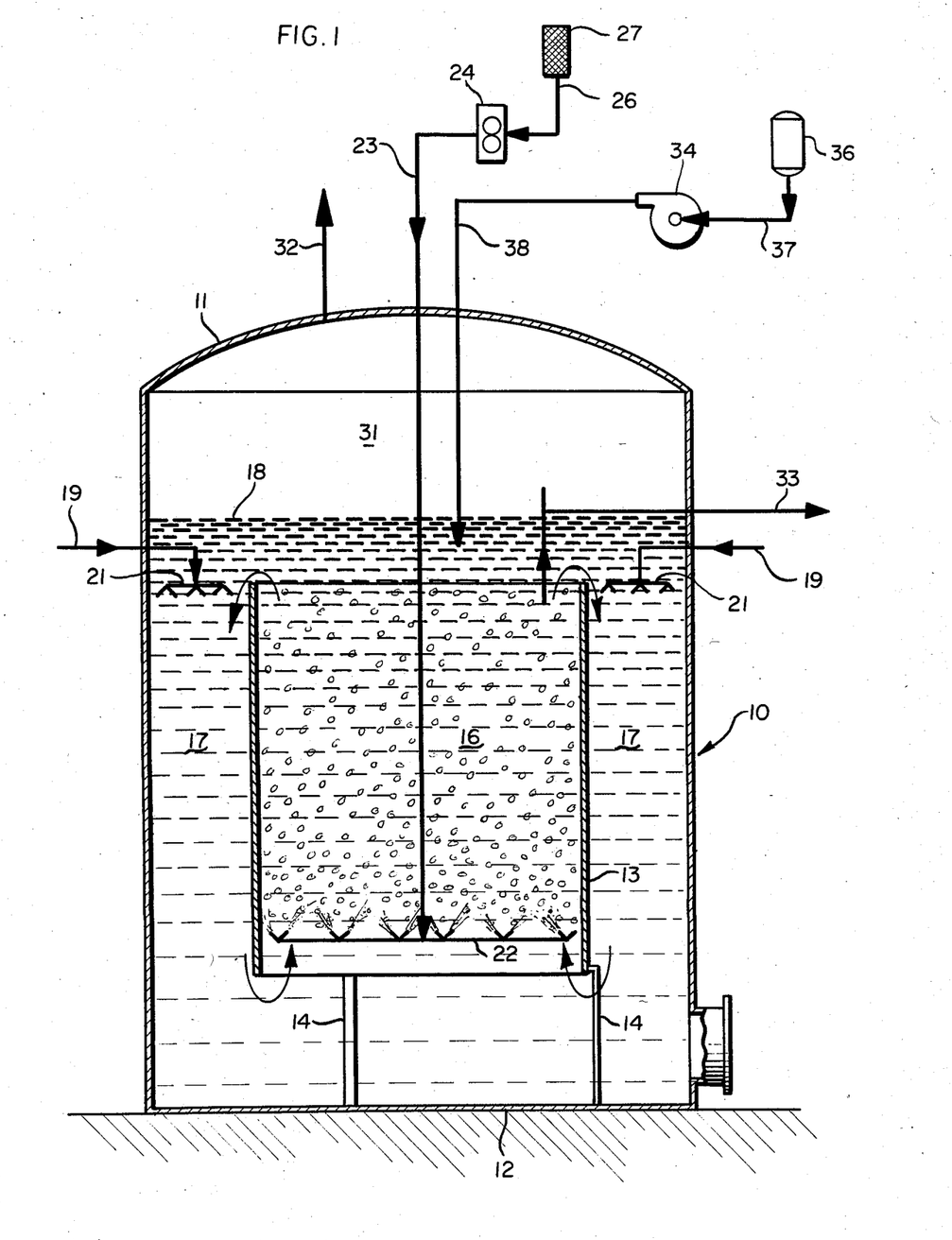
FIG. 1 is a schematic flow sheet illustrating one specific embodiment of an apparatus for practicing the invention.

The system illustrated in FIG. 1 utilizes the autocirculation principle described in U.S. Pat. No. 4,238,462, which is incorporated herein by reference. In an autocirculation system, separate but contiguous fluid contacting zones are provided within a single or common liquid-containing vessel and these zones are in open or unobstructed fluid communication so as to permit automatic recirculation of liquid between the zones by reason of a density difference between the liquids in the respective zones. The invention is not limited to the use of the autocirculation principle and may also be practiced by pumping the recirculating liquid through interconnecting pipes between separate vessels. The invention, however, requires the recirculation of a very large volume of liquid from the oxygenation zone to the reaction zone for diluting the sour water feed. Consequently, the use of the autocirculation principle is particularly advantageous in order to eliminate the large pumping costs that would be associated with other recirculating systems.

As illustrated in FIG. 1, one embodiment of the autocirculation system comprises an upright cylindrical vessel 10 having a top wall 11 and a flat bottom wall 12. An upright tubular partition or centerwell 13 is supported within the vessel 10 by a plurality of brackets 14 extending between the lower end of the centerwell 13 and the bottom wall 12 of the vessel 10. As shown in FIG. 1, the centerwell 13 is disposed concentrically within the vessel 10 and has its upper and lower ends spaced from the vessel top wall 11 and bottom wall 12, respectively. The space within the centerwell 13 comprises an oxygenation zone 16, and the annular space between the centerwell 13 and the side wall of the vessel 10 comprises a reaction zone 17. Alternatively, a plurality of partitions or centerwells may be disposed throughout the vessel 10 in order to maintain a relatively uniform flow distribution.

As indicated by the dashed liquid level line 18, the vessel 10 contains a recirculating liquid mixture comprising a dilute aqueous catalyst solution of a chelated polyvalent metal such as iron. The reaction zone 17 and the oxygenation zone 16 are each open at their upper and lower ends, and the liquid level 18 is above the upper end of the centerwell 13 so that the respective upper ends of the reaction and oxygenation zones are in open or unobstructed fluid communication, and the same is true for the respective lower ends of the two zones.

Sour water feed, such as geothermal condensate, containing dissolved hydrogen sulfide is fed through a supply line (not shown) and a plurality of branch lines 19 to a ring header or liquid distributor 21 that is positioned at or closely adjacent the upper inlet end of the reaction zone 17. The branch lines 19 are arranged symmetrically so that the sour water feed is distributed evenly over the entire annular reaction zone 17. A sparger ring 22 is positioned adjacent the lower inlet end of the oxygenation zone 16 and is supplied with air at a controlled rate through a line 23 connected to a blower 24 having an inlet line 26 with a filter 27.

As indicated schematically in FIG. 1, the air bubbles upwardly through the liquid in the oxygenation zone 16 so as to effect an increase in the dissolved oxygen content of the catalyst solution. The size or volume of the oxygenation zone 16 is large enough to insure that the oxygenated liquid contains sufficient dissolved oxygen to accomplish the desired oxidation of dissolved hydrogen sulfide in the reaction zone while also preventing over-reduction of the chelated iron catalyst, as explained below.

The flow rate of air into the oxygenation zone is high enough so that the density of the air-laden liquid mixture in the oxygenation zone 16 is substantially less than the density of the gas-free liquid mixture in the annular reaction zone 17. As shown by the arrows in FIG. 1, the higher density liquid mixture flows downwardly through the reaction zone 17, and the lower density liquid-gas mixture flows upwardly through the oxygenation zone 16, thereby providing an automatic recirculation system that does not require the use of pumps or the like. At the upper portion of the oxygenation zone 16 the oxygenated liquid overflows the upper end of the centerwell 13 and immediately mixes with and dilutes the sour water feed from the distributors 21 for downward flow through the reaction zone 17. Excess air is released from the oxygenated liquid and collects in the freeboard space, designated at 31, in the upper end of the vessel 10 between the top wall 11 and the liquid level 18. This excess air which is substantially free of hydrogen sulfide and has a slightly diminished oxygen content is discharged through a vent line 32.

A minor portion of the oxygenated liquid mixture is removed from the regeneration zone 16 through an overflow line or conduit 33 located at the liquid level 18 and extending downwardly into the upper end of the oxygenation zone 16 to insure that the sour water feed does not bypass the system. Substantially the balance, or major portion, of the oxygenated liquid is recirculated within the system as previously described. The oxygenated liquid withdrawn through the line 33 constitutes the sweet water product of the process. This product contains a low concentration of dissolved chelated iron which is nontoxic and environmentally acceptable so that the product may be discarded if desired. In the case of geothermal condensate, the sweet water product may be supplied to a cooling tower and introduced into the cooling water circuit for the geothermal steam condensers, or it may be reinjected into the geothermal formation by means of disposal wells.

In order to replace the chelated iron lost from the system in the product removed through the line 33, replacement chelated iron, preferably as a concentrate, is introduced into the system at any desired point. In FIG. 1 the means for introducing replacement chelated iron comprises a catalyst metering pump 34 that withdraws chelated iron concentrate from a storage tank 36 through a suction line 37 and discharges the replacement catalyst at a controlled rate through a line 38 extending through the top wall 11 of the vessel 10 and terminating below the liquid level 18 adjacent the upper outlet end of the regeneration zone 16 so that the concentrate is rapidly mixed with the recirculating liquid that overflows the upper end of the centerwell 13.

Elemental sulfur is formed during the oxidation reaction in the reaction zone 17, and fine sulfur particles, e.g., in the 0.1 to 5 μm range, are retained in the recirculating liquid mixture as a colloidal suspension and are removed continuously in the sweet water product withdrawn through the line 33. Optionally, if sulfur recovery is desirable, the product stream, or other stream withdrawn from the vessel 10, may be filtered or settled for sulfur removal. For example, a separate sulfur settler (not shown) may be connected to the vessel 10, and a side stream of sulfur-containing liquid may be supplied to the settler. In the settler, the sulfur particles are allowed to agglomerate to a larger particle size, typically in the 10–20 μm range, which settle into a cone-shaped bottom portion of the settler to form a 10-20 wt. % slurry. The slurry may then be passed through a heater or heat exchanger so as to melt the sulfur. The mixture of aqueous catalyst solution and molten sulfur is then introduced into a separator from which the molten sulfur phase is withdrawn to a storage pit.

Prior to entry of the sour water feed into the system, the dissolved hydrogen sulfide has ionized to form bisulfide ions and sulfide ions, as represented by the following equations:

$$H_2S\ (aq.) \rightarrow H^+ + HS^- \tag{1}$$

$$HS^- \rightarrow H^+ + S^{=} \tag{2}$$

In the reaction zone 17 the principal reaction is the oxidation of the sulfide ions to elemental sulfur by the dissolved oxygen supplied in the freshly oxygenated catalyst solution that is recirculated to the reaction zone, as represented by the following equation:

$$S^{=} + O(aq) + H_2O \rightarrow S^\circ \downarrow + 2(OH)^- \tag{3}$$

Although the chelated iron is present at a very low concentration which is much less than the stoichiometric requirement for oxidizing sulfide ion, nevertheless, the sulfide ions also react selectively with ferric ions in the reaction zone to form sulfur according to the following equation:

$$S^{=} + 2Fe^{+++} \rightarrow S^\circ \downarrow + 2Fe^{++} \tag{4}$$

Thus, during the sulfide oxidation reaction the atoms of chelated iron are reduced from a higher valence state to a lower valence state, but also they are almost immediately reoxidized to the higher valence state by reaction with the dissolved oxygen in the solution as illustrated in the following equation:

$$2Fe^{++} + O(aq) + H_2O \rightarrow 2Fe^{+++} + 2(OH)^- \tag{5}$$

A result, the chelated iron in the solution in the reaction zone maintains an average state of partial reduction while the dissolved oxygen concentration of the solution is gradually reduced as the solution passes through the reaction zone.

In addition, the dissolved oxygen in the liquid mixture in the reaction zone 17 may also react to some extent with bisulfide ions to form thiosulfate and sulfate products in accordance with the following equations:

$$2HS^- + 4O + H_2O \rightarrow H_2S_2O_3 + 2(OH)^- \tag{6}$$

$$HS^- + 4O + H_2O \rightarrow H_2SO_4 + (OH)^- \tag{7}$$

The thiosulfate and sulfate compounds are water soluble and are removed from the system in the sweet water product withdrawn through line 33. At the relatively low concentrations of dissolved hydrogen sulfide typically found in sour geothermal condensate, the reactions forming thiosulfate and sulfate do not cause any significant reduction in the pH of the solution so that it is usually unnecessary to add a buffer or other alkaline material for pH control. However, suitable additions for maintaining an alkaline pH may be made when necessary.

As explained above, the liquid mixture exiting downwardly from the reaction zone 17 and flowing upwardly in the oxygenation zone 16 contains iron that is intermediate in valence between the ferrous or reduced state and the ferric or oxidized state. When this liquid is contacted concurrently with air in the oxygenation zone 16, oxygen is absorbed or dissolved in the liquid and the oxidation state of the iron is increased as some or the ferrous ions are oxidized to the ferric state as shown by equation (5). The spent air, with a small fraction of the oxygen removed, is discharged from the top of the vessel 10 as previously described.

There are several operating requirements that must be satisfied in the system described above in order to provide a process which has a high hydrogen sulfide removal efficiency and is also economically feasible.

Although neither ferrous ions nor ferric ions are stable in aqueous solutions containing sulfide ions, the instability of the ferrous ion is a particular problem because of the inability or limited ability of many types of chelating agents to prevent precipitation of ferrous sulfide in accordance with the following equation:

$$S^{=} + Fe^{++} \rightarrow FeS \tag{8}$$

In order to insure that the principal reaction of equation (3) occurs and also that the sulfide ions react with ferric ions, as in equation (4), instead of with ferrous ions, as in equation (8), the sulfide ion concentration of the liquid mixture in the reaction zone 17 must not be allowed to exceed the sum of the dissolved oxygen concentration and one-half of the ferric ion concentration. Otherwise, ferrous sulfide precipitation will occur and it will be difficult or impossible to maintain the desired effective catalyst concentration at a reasonable cost. Accordingly, an important requirement of the invention is that the molar ratio of dissolved oxygen plus one-half the ferric ion to sulfide ion in the liquid mixture in the reaction zone 17 must be maintained greater than about 1:1. This requirement may be represented by the following equation:

$$\frac{C_o + \frac{1}{2}C_{Fe+3}}{C_{s-2}} > 1{:}1 \tag{9}$$

where $C_o$ is the molar concentration of dissolved oxygen ($O_{aq}$), $C_{Fe+3}$ is the molar concentration of ferric ion ($Fe^{+++}$), and $C_{s-2}$ is the molar concentration of sulfide ion ($S^{=}$). The extent to which the 1:1 ratio must be exceeded may vary dependent upon the specific values or levels of the operating variables that control the efficiency of hydrogen sulfide removal, particularly the iron concentration of the solution, the available residence time for the system volume, and the dissolved oxygen content of the solution.

In theory, the desired excess of dissolved oxygen plus ferric ion over sulfide ion could be maintained by utilizing an oxygenated catalyst solution having a relatively high concentration of chelated iron. However, the use of such a high concentration of chelated iron would result in the loss of excessive amounts of expensive chelating agent in the sweet water product removed from the system through line 33, and for economic reasons such loss must be avoided. The present invention meets the foregoing requirements by utilizing in the reaction zone a very dilute aqueous solution containing a catalytic amount of chelated iron and by recirculating a massive quantity of oxygenated catalyst solution from the oxygenation zone to the reaction zone so as to dilute the dissolved hydrogen sulfide content of the incoming sour water feed and at the same time furnish more than the required amount of dissolved oxygen. In this manner, the concentration of chelated iron in the system is always low enough so that the cost of the catalyst lost in the removed product stream is minimal. At the same time, the mixing of the sour water feed with a large excess of oxygenated catalyst solution from the oxygenation zone insures that the dissolved oxygen content of the solution is always high enough relative to the dissolved sulfide ion concentration to maintain the chelated iron in an intermediate state between fully oxidized ferric iron and reduced ferrous iron, thereby preventing the formation of ferrous sulfide by over-reduction of the iron.

In general, the liquid mixture in the reaction zone 17 should contain a catalytic amount of chelated iron selected from the range of from about 0.5 ppm to about 5 ppm by weight, and preferably from about 1 ppm to about 3 ppm by weight. Because chelated iron catalyst is lost from the system, principally in the sweet water product withdrawn at line 33, the desired iron concentration within the aforementioned range is maintained by correlating the rate of introduction of replacement chelated iron catalyst through line 38 with the rate of removal of sweet water product through line 33 so as to compensate for the loss of catalyst from the system.

The rate of recirculation of oxygenated liquid mixture from the oxygenation zone to the reaction zone is controlled in relation to the dissolved oxygen and iron content of the liquid and in relation to the sour water feed rate so as to insure that the molar ratio of dissolved oxygen plus one-half the ferric ion to sulfide ion is greater than about 1:1. With a hydrogen sulfide content of from about 10 ppm to about 1000 ppm in the sour water feed, a dissolved oxygen content in the oxygenated solution of from about 1 ppm to about 5 ppm, and an iron concentration in the solution of from about 0.5 ppm to about 5 ppm, it will ordinarily be desirable to maintain a volumetric recirculation rate of from about 2.5 to about 1000 volumes of recycled oxygenated solution per volume of sour water feed.

Another operating requirement of the present invention is that the sour water must be introduced into the system in such a way that it is not contacted with air or gaseous oxygen until after it has been diluted with a massive amount of recirculated solution from the oxygenation zone and has passed through the reaction zone. As seen in FIG. 1, the sour water feed distributors 21 are located in the annular inlet area of the reaction zone 17 so that the sour water feed is introduced only into a nonaerated portion of the recirculating liquid and is immediately diluted with freshly oxygenated catalyst solution overflowing the centerwell 13. The recirculated liquid from the oxygenation zone contains both the dissolved oxygen required for the oxidation of the dissolved hydrogen sulfide in the sour water feed and the catalyst necessary to bring about the reaction. Furthermore, since both the sour water feed and the solution recycled from the oxygenation zone are essentially free of entrained air or other entrained gas, the hydrogen sulfide oxidation reaction in the reaction zone 17 is effected substantially entirely in liquid phase without contact with air or other oxygen-containing gas and without contact with a stripping gas capable of stripping dissolved hydrogen sulfide from the liquid as is required in the system disclosed in U.S. Pat. No. 4,076,621.

The dissolved oxygen supplied in the oxygenated catalyst solution must be at least the stoichiometric amount for oxidation of sulfide ion so as to effect substantially complete oxidation of the dissolved hydrogen sulfide in the sour water feed introduced into the reaction zone. In general, a hydrogen sulfide removal efficiency of at least about 90% is desirable, preferably at least about 95%. Ordinarily, the introduction of air into the liquid in the oxygenation zone 16 at a rate sufficient to lower the density of the liquid enough to obtain automatic recirculation will also insure that the oxygenated liquid stream contains the required amount of dissolved oxygen, e.g., from about 1 ppm to about 5 ppm.

In the known gas-liquid contact processes for removing hydrogen sulfide from a gas stream using an aqueous solution of chelated polyvalent metal, the chelated metal functions both as a reagent and as a catalyst, and the critical variable of the process is the ratio of ferric ion to sulfide ion which must be greater than about 2:1. The present invention, however, utilizes a homogeneous liquid-liquid contact system in which oxidation of dissolved hydrogen sulfide is conducted entirely in the liquid phase relying on dissolved oxygen as the oxidizing agent, and the crucial variable is the molar ratio of dissolved oxygen to dissolved sulfide ion which, as seen in equation (3) above, must be at least equal to, and preferably greater than, about 1:1. By observing this requirement, the sulfide ions in the sour water feed are substantially completely oxidized to sulfur in the reaction zone, and over-reduction of the catalyst is also avoided. Any slight amount of sulfide ion that may remain in the solution leaving the reaction zone is eliminated in the oxygenation zone and does not cause any serious problem.

An additional important operating requirement of the present invention is the necessity of providing a relatively long residence time for the catalytically induced liquid phase oxidation of sulfide ion. In the prior art, gas-liquid contact processes for removing hydrogen sulfide from gas streams using an aqueous chelated iron solution at relatively high iron concentrations, the hydrogen sulfide oxidation reaction rate is extremely rapid and is dependent almost entirely upon the rate of mass transfer from the gas phase to the liquid phase. In the present invention, however, the iron acts primarily as a catalyst at very low concentrations in a liquid phase system, and it is necessary to provide a relatively prolonged residence time in order to insure substantially complete removal of hydrogen sulfide.

As a practical matter, it is convenient to define residence time as the system volume, i.e., the combined volume of the reaction zone and the oxygenation zone, divided by the volume flow rate of the sour water feed. At steady state operation, the sweet water withdrawn will be slightly less than sour water entering the unit because the amount of water evaporated due to the heat generated by the sulfur oxidation reaction is greater than the amount of water produced by the reaction. Accordingly, residence time is controlled by regulating the sour water feed rate, and a corresponding sweet water withdrawal rate is obtained automatically by reason of the overflow product withdrawal arrangement. On this basis, the present invention utilizes a residence time of th sour water in the system selected from the range of from about 5 to about 120 minutes, particularly from about 15 to about 45 minutes, in order to obtain at least about 90% removal of hydrogen sulfide and preferably at least about 95%.

The vessel 10 is designed so that the sizes or volumes of the reaction zone 17 and the oxygenation zone 16 are large enough to accommodate the desired range of residence times without excessive or impractical liquid velocities in these zones. In practice, the reaction zone and the oxygenation zone will usually have approximately equal volumes so that the reaction time or contact time between the sour water feed and the catalyst solution in the reaction zone 17 will be approximately half of the residence time as defined above. The sour water feed rate, and thus the residence time, is correlated with the sulfide content of the sour water feed in order to obtain a desired low residual sulfide content in the sweet water product. Thus, for a given system of fixed volume, if the sour water feed rate is increased, the residence time will be lowered resulting in a higher sulfide content in the product, and vice versa. In general, the system will be designed so that when operating at the design sour water feed rate, a single pass of the sour water through the reaction zone is sufficient to reduce the sulfide content of the product to a predetermined maximum level. By lowering the feed rate, and thereby increasing the residence time, the sulfide content of the product is reduced to a desired extent below the maximum permissible level.

Figures 2, 3:
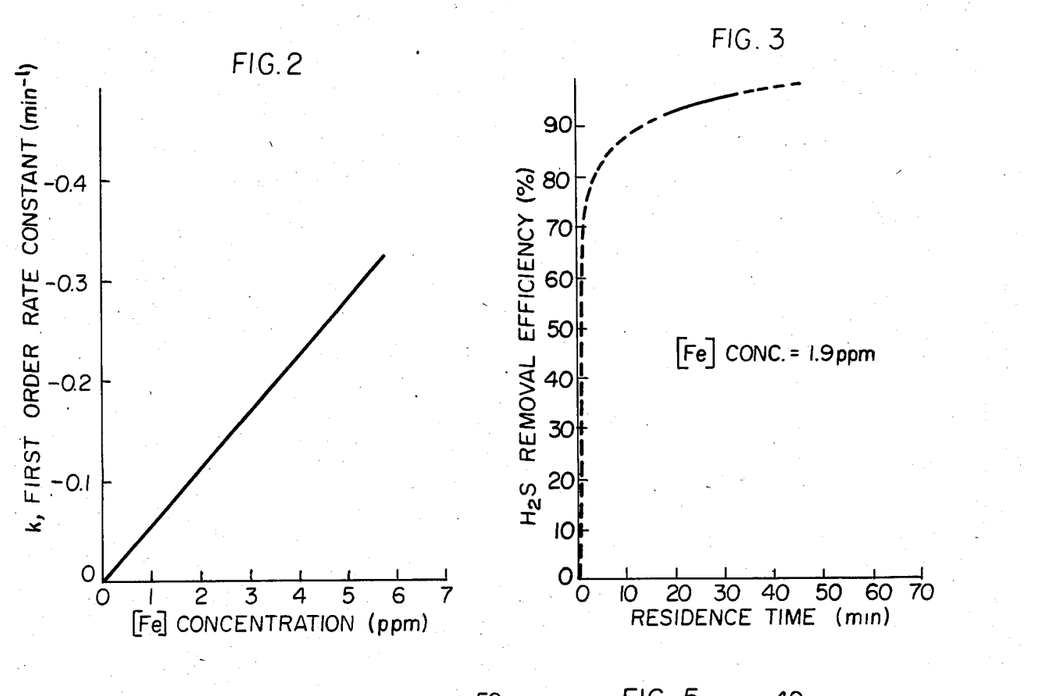
FIG. 2 is a curve showing the relationship between the first order rate constant and the iron concentration in the process of the invention.
FIG. 3 is a curve showing the relationship between the sulfide removal efficiency of the process and residence time.
Figures 4, 5:
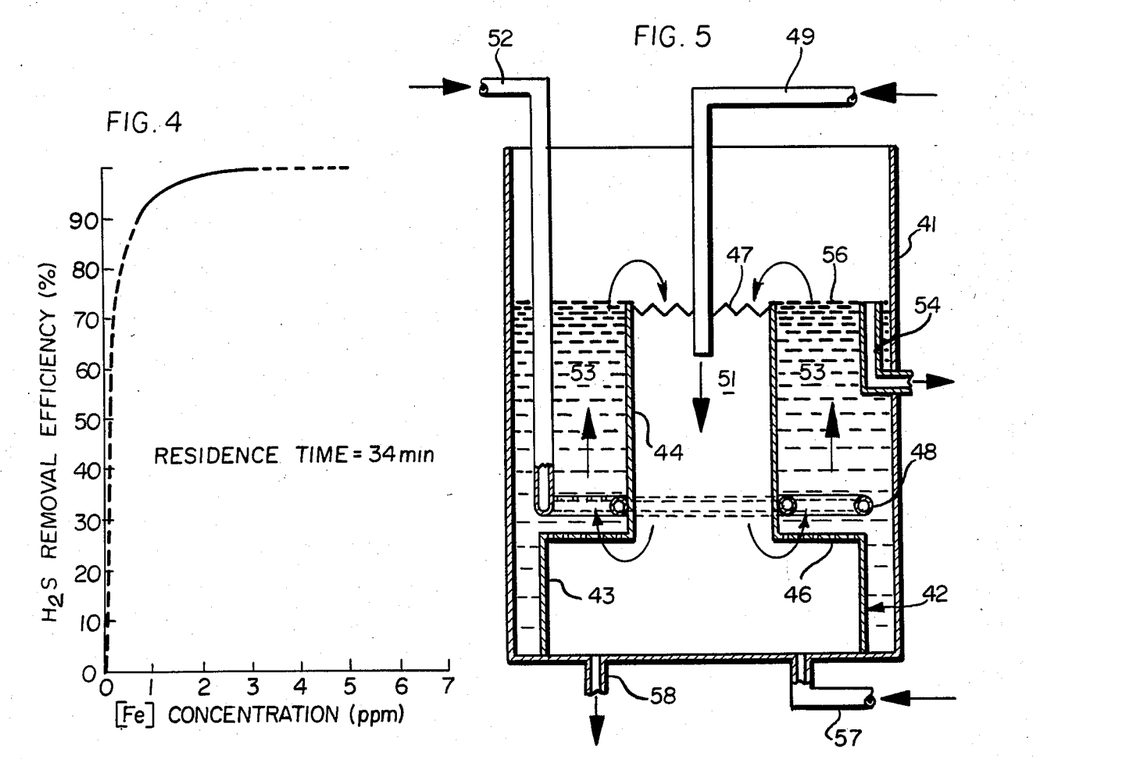
FIG. 4 is a curve showing the relationship between the sulfide removal efficiency of the process and iron concentration.
FIG. 5 is a schematic illustration of an experimental apparatus used for evaluating the invention.

FIGS. 2, 3, and 4, which are based on the experimental data from Example 1 below, illustrate the interdependence of iron concentration and residence time in the reaction zone and the importance of correlating these operating variables in order to obtain high efficiency of hydrogen sulfide removal. FIG. 2 shows that the first order rate constant is proportional to the iron concentration of the catalyst solution. Thus, for example, doubling the iron concentration of the solution reduces the required solution volume in half. FIG. 3 shows that for a given iron concentration the sulfide removal efficiency increases with increasing residence time. FIG. 4 shows that for a given residence time the hydrogen sulfide removal efficiency increases with increasing iron concentration.

Any suitable chelating agent may be used for formulating the chelated polyvalent metal catalyst solution, particularly the aminopolycarboxylic acid type chelating agents and the polyhydroxy type chelating agents.

The aminopolycarboxylic acid type chelating agents useful in the present invention include monoaminopolycarboxylic acids, polyaminopolycarboxylic acids, polyaminoalkyl polycarboxylic acids, and polyaminohydroxyalkyl polycarboxylic acids. Usually the aforementioned types of chelating agents, either singly or as a mixture, will be used in the form of their alkali metal salts, particularly the sodium salts. The polyaminopolyacetic acids and the polyaminohydroxyethyl polyacetic acids, or their sodium salts, are particularly desirable. Specific examples of particularly useful chelating agents within the foregoing class are nitrilotriacetic acid (NTA), ethylenediaminetetraacetic acid (EDTA), N-hydroxyethyl ethylenediamine triacetic acid (HEDTA), and diethylenetriamine pentaacetic acid (DTPA).

The useful polyhydroxy type chelating agents include monosaccharides (such as glucose and fructose), disaccharides (such as sucrose, lactose, and maltose), reduced monosaccharides (such as sorbitol), reduced disaccharides (such as mannitol), monosaccharide acids (such as glucoheptanoic acid), disaccharide acids (such as gluconic acid), and their alkali metal salts. In particular, sorbitol is a preferred chelating agent of this type. A preferred embodiment of the present invention comprises the use of an aminopolycarboxylic acid type chelating agent in combination with a polyhydroxy type chelating agent as disclosed in U.S. Pat. No. 4,189,462 which is incorporated herein by reference. As explained in this patent, the combination of these two types of chelating agents insures that the iron will be retained in solution over a wide range of pH and other process conditions.

Although the invention is described herein with particular emphasis on the use of iron as the polyvalent metal of choice, other polyvalent metals that form chelates with aminopolycarboxylic acid type and polyhydroxy type chelating agents can also be used. Such additional polyvalent metals include copper, vanadium, manganese, platinum, tungsten, nickel, mercury, tin, and lead.

The chelated iron catalyst solution used in the present invention is preferably prepared by dissolving a suitable iron salt in water, separately dissolving the chelating agent in water, and mixing the two solutions to provide a concentrate. The pH of the concentrate may be acidic, alkaline, or neutral, depending upon the properties of the sour water being treated. The pH of the concentrate may be adjusted, if desired, by adding the required amount of an alkaline material or acidic material. An appropriate amount of the concentrate can be diluted with water as required to obtain the desired amount of initial operating solution having the desired iron content. The replacement chelated iron added to the system through line 38 is preferably the concentrate.

The contacting of the sour water feed with the operating solution in the reaction zone 17 may be carried out at ambient conditions of temperature and pressure, but temperatures of from about 5 to about 65° C. and pressures ranging from subatmospheric to 100 atmospheres or greater can be used. An alkaline or substantially alkaline pH ranging from about 6 to about 13, particularly from about 6 to about 10.5, is maintained by adding alkaline or acidic material if and as required. The redox potential of the solution is used as a measure of catalyst activity as reflected by the ratio of ferric to ferrous ions in solution. Maintaining a redox potential of from about −50 to about −200, as measured by a calomel electrode, at the outlet end of the reaction zone 17 is desirable.

The following specific examples are presented to illustrate the invention but are not to be construed as limiting the scope of the invention.

EXAMPLE I

An autocirculation pilot plant was used to simulate the treatment of sour water with an aqueous catalyst solution of chelated iron. As shown schematically in FIG. 5, the pilot plant consists of a 55-gallon drum 41 having a centrally located circular partition or insert 42 supported on the bottom wall of the drum. The insert 42 has a large diameter lower portion 43 and an integrally connected upper portion 44 of smaller diameter. A perforated annular wall 46 interconnects the portions 43 and 44. The upper end of the portion 44 is provided with a sawtooth edge 47. A perforated sparger ring 48 is positioned in the drum 41 closely overlying the perforated wall 46.

During operation of the pilot plant, sour water was fed into the interior of the insert portion 44 by means of an inlet line 49 terminating below the sawtooth edge 47. The interior of the insert portion 44 defines a reaction zone designated at 51. Oxidizing air was fed to the sparger ring 48 by an inlet pipe 52 so as to bubble air upwardly through the liquid contained in the drum in the annular space 53 defined between the insert portion 44 and the wall of the drum 41. This annular space 53 comprises the oxygenation zone. Treated sour water was removed from the drum by means of an overflow pipe 54 having its inlet end positioned at approximately the height of the liquid level within the drum, as indicated at 56. Replacement catalyst solution was supplied to the drum through a pipe 57 connected to the bottom wall of the drum 41 and communicating with the interior of the insert portion 43. A drain pipe 58 is also connected to the bottom wall of the drum 41 at a remote location from the pipe 57 for removal of sulfur slurry. Autocirculation of the liquid in the system was established, as shown by the arrows, by upward flow of the aerated liquid in the oxygenation zone 53 and over the sawtooth edge 47 for dilution of the incoming sour water feed through line 49, downward flow of the diluted mixture through the reaction zone 51 to the enlarged portion 43 of the insert 42, and then upwardly through the perforated wall 46 into the oxygenation zone 53.

Tests were conducted with the pilot plant to evaluate the effect of iron concentration and residence time on the efficiency of hydrogen sulfide removal. Simulated sour water feed was prepared by metering concentrated aqueous sodium sulfide (62,550 ppm sulfide) into a tap water stream to obtain a sulfide ion concentration of about 10 ppm. Chelated iron concentrate was prepared containing about 20,000 ppm by weight iron with NTA and sorbitol as chelating agents. This simulated sour water was fed to the pilot plant and the chelated iron concentrate was metered into the unit to obtain a selected iron concentration and residence time. The pilot plant tests were conducted at varying iron concentrations and residence times. The sulfide content of the inlet sour water and the outlet product were measured to determine the sulfide removal efficiency. The averaged test data are shown in Table 1.

TABLE 1

| Test | Fe Concentration (ppm) | Efficiency (% Sulfide Removed) | Residence Time (minutes) | Rate Constant (min$^{-1}$) |
|---|---|---|---|---|
| 1 | 5.3 | 90.5 | 7 | −0.336 |
| 2 | 3.2 | 98.9 | 34 | −0.135 |
| 3 | 2.3 | 98.7 | 34 | −0.127 |
| 4 | 1.9 | 92.2 | 18 | −0.146 |
|   |     |      |    | (AV −0.127) |
| 5 | 1.9 | 97.0 | 34 | −0.108 |
| 6 | 1.2 | 95.5 | 34 | −0.091 |
| 7 | 0.7 | 86.9 | 34 | −0.060 |

These tests show that successful operation with a hydrogen sulfide removal efficiency of at least about 90% was readily obtained. For the configuration and size of the pilot plant unit, it was concluded that optimum results were obtained at a residence time of about 34 minutes and an iron concentration of from about 1 to about 3 ppm.

The data from Table 1 provided the basis for the curves shown in FIGS. 2, 3, and 4. As previously explained, FIG. 2 illustrates that there is a proportional relationship between the first order rate constant and the iron concentration. FIG. 3 shows that hydrogen sulfide removal efficiency is a function of residence time at a given iron concentration. FIG. 4 shows that hydrogen sulfide removal efficiency is a function of iron concentration at a given residence time.

EXAMPLE II

A test was run in the same pilot plant unit using an aqueous solution of sodium glucoheptonate as the chelating agent for iron. A stock solution containing 50,000 ppm by weight of iron chelated in a 1:1 mole ratio with sodium glucoheptonate was prepared. From this stock solution, a metering solution was prepared containing approximately 500 ppm by weight iron. The pilot plant was operated so as to obtain an iron concentration of 1 ppm with an inlet sulfide concentration of 10 ppm and a residence time of 34 minutes. Under these conditions, the tests showed a hydrogen sulfide removal efficiency of about 90 to 92%. When the iron concentration of the liquid in the system was reduced to 0.5 ppm at the same inlet sulfide concentration and the same residence time, the hydrogen sulfide removal efficiency was about 83%. In another test, the residence time was increased to 68 minutes while using an iron concentration of 1 ppm and an inlet sulfide concentration of 10 ppm. As a result, the hydrogen sulfide removal efficiency increased to about 93%.

These tests demonstrate that glucoheptonate is a viable and less expensive alternative for chelating iron at low levels.

EXAMPLE III

A commercial unit for processing a sour water stream from a food plant was designed using an autocirculation system as illustrated in FIG. 1 and a chelated iron catalyst solution similar to the one used in Example I. The design basis and the selected design criteria are shown in Table 2.

TABLE 2

| Design Basis | |
|---|---|
| Sour Water Source | Effluent Scrubber |
| Liquid Flow Rate (GPM) | 933 |
| Liquid Temperature (°F.) | 95 |
| Liquid Composition | |
| H$_2$S ppm | 84.1 |
| pH | 7 |
| Spent Air Outlet (PSIG) | 0.5 |
| Effluent Sulfide Concentration ppm | 0.5 |
| Sulfide Removal Efficiency (%) | 99.4 |
| Design Criteria | |
| Iron Concentration ppm | 1.0 |
| Solution Circulation Rate (GPM) | 78,516 |
| Solution Temperature (°F.) | 95 |
| Oxidizer Air (SCFM) | 1039 |

A material balance for the process is shown in Table 3. The various streams are identified by the same reference numerals used in FIG. 1.

TABLE 3

| Stream Name | Stream No. | | | | | |
|---|---|---|---|---|---|---|
| | 19 Sour Water In | 33 Sweet Water Out | 26 Blower Inlet | 23 Oxidizer Air In | 32 Spent Air Out | 38 Catalyst Addition |
| $H_2O$ | 25942.20 | 25940.18 | 5.31 | 5.31 | 9.10 | 0.628 |
| $S^=$ | 1.23 | 0.007 | — | — | — | — |
| $S^0$ | — | 1.20 | — | — | — | — |
| Fe | — | 0.008 | — | — | — | 0.009 |
| $N_2$ | — | — | 125.73 | 125.73 | 125.73 | — |
| $O_2$ | — | — | 33.42 | 33.42 | 32.79 | — |
| $S_2O_3^=$ | — | 0.012 | — | — | — | — |
| Total | 25943.43 | 25941.41 | 164.46 | 164.46 | 167.62 | 0.637 |
| LB/HR | 466999.0 | 466963.0 | 4685.6 | 4685.6 | 4733.4 | 11.8 |
| MW | 18 | 18 | 28.49 | 28.49 | 28.24 | 18.52 |
| SG | 1.0 | 1.0 | 0.93 | 1.39 | 0.96 | 1.2 |
| SCFM (GPM) | (933) | (932.9) | 1038.855 | 1038.855 | 1058.86 | (0.02) |
| TEMP (°F.) | 95 | 95 | 100 | 197 | 95 | 95 |
| PRESS (PSI) | 10 | 0 | 0 | 11 | 0.5 | 12 |
| MM BTU/HR | 0 | 0.1831 | 0.1053 | 0.2192 | 0.1709 | 0 |

Although the autocirculation apparatus illustrated in FIG. 1 for practicing the process of the invention utilizes a central reaction zone and a surrounding annular oxygenation zone, it will be understood that other configurations and modifications may be used. For example, the autocirculation vessel may contain a pair of concentrically spaced cylindrical partitions defining an annular reaction zone between the partitions and an oxygenation zone comprising a centerwell portion within the innermost partition and an annular portion between the outermost partition and the vessel wall. Other configurations can also be used as disclosed in U.S. Pat. No. 4,238,462.

Although applicable to the treatment of sour water from any source, the invention is particularly effective for the treatment of sour geothermal condensate having a relatively low content of dissolved hydrogen sulfide, e.g., from about 10 ppm to about 500 ppm. The sulfur formed in the process is removed in the sweet condensate as a colloidal suspension of fine sulfur particles which are less likely to cause plugging if the sweet condensate is reinjected into the geothermal formation in the customary manner.

I claim:

1. A continuous process for treating sour water with an aqueous catalyst solution of a chelated polyvalent metal to effect catalytic liquid phase oxidation of dissolved hydrogen sulfide to sulfur by means of dissolved oxygen, wherein said polyvalent metal is reduced from a higher valence state to a lower valence state during said oxidation of hydrogen sulfide, said process comprising:

providing a recirculating system having a reaction zone for said oxidation of hydrogen sulfide and an interconnected oxygenation zone for introducing oxygen into said catalyst solution;

continuously recirculating between said reaction zone and said oxygenation zone a liquid mixture comprising a dilute aqueous catalyst solution containing a catalytic amount of a chelated polyvalent metal such that the liquid mixture has a predetermined polyvalent metal ion content selected from the range of from about 0.5 ppm by weight to about 5 ppm by weight;

introducing sour water feed containing dissolved hydrogen sulfide into an inlet portion of said reaction zone, and immediately mixing and diluting said sour water feed at said inlet portion with a massive excess of oxygenated liquid mixture recirculated from said oxygenation zone so as to maintain the molar ratio of dissolved oxygen plus one-half the higher valence polyvalent metal ion to sulfide ion in said liquid mixture in said reaction zone greater than about 1:1, said mixing and diluting being effected substantially entirely in liquid phase in said reaction zone so that said sour water feed is not contacted with air or gaseous oxygen or a stripping gas capable of stripping dissolved hydrogen sulfide from the liquid mixture until after the sour water has been diluted and has passed through said reaction zone;

introducing air or other oxygen-containing gas into said oxygenation zone, and therein contacting the air or other oxygen-containing gas with said liquid mixture recirculated from said reaction zone under conditions effective to increase the dissolved oxygen content of said liquid mixture and also to oxidize the reduced polyvalent metal to its higher valence state;

withdrawing a minor portion of the resultant oxygenated liquid mixture from said oxygenation zone as the sweet water product of the process, substantially the balance of the oxygenated liquid mixture being recirculated from said oxygenation zone to said reaction zone;

introducing replacement chelated polyvalent metal into the system at a rate sufficient to replace that removed in said sweet water product and to maintain said predetermined polyvalent metal ion content in said liquid mixture;

regulating the sour water feed rate and the sweet water product withdrawal rate to provide a predetermined residence time of the sour water in the system selected from the range of from about 5 to about 120 minutes; and correlating said predetermined residence time and said predetermined polyvalent metal ion content so as to obtain substantially complete oxidation of the hydrogen sulfide in the sour water feed to sulfur.

2. The process of claim 1, wherein the sulfur formed by oxidation of said hydrogren sulfide is removed from the system in said sweet water product.

3. The process of claim 1, wherein said polyvalent metal is iron.

4. The process of claim 1, wherein said polyvalent metal is iron, and the iron content of said liquid mixture is from about 1 ppm by weight to about 3 ppm by weight.

5. The process of claim 1, wherein said predetermined residence time is from about 15 to about 45 minutes.

6. The process of claim 1, wherein said predetermined residence time and said predetermined polyvalent metal content are correlated so as to obtain a hydrogen sulfide removal efficiency of at least about 90%.

7. The process of claim 1, wherein the volumetric recycle ratio of recirculated liquid mixture to sour water feed is from about 2.5 to about 1000.

8. The process of claim , wherein said replacement chelated polyvalent metal is introduced adjacent an outlet portion of said oxygenation zone and is rapidly mixed with said liquid mixture being recirculated from said oxygenation zone to said reaction zone.

9. The process of claim 1, wherein said sweet water product is withdrawn through an overflow extending into an outlet portion of said oxygenation zone.

10. The process of claim 1, wherein said chelated polyvlent metal comprises iron chelated with a chelating agent selected from the group consisting of monoaminopolycarboxylic acids, polyaminopolycarboxylic acids, polyaminoalkyl polycarboxylic acids, and their alkali metal salts.

11. The process of claim 10, wherein said catalyst solution also contains a polyhydroxy-type chelating agent.

12. The process of claim 11, wherein said polyhydroxy-type chelating agent comprises sorbitol.

13. The process of claim 1, wherein said chelated polyvalent metal comprises iron chelated with nitrilotriacetic acid.

14. The process of claim 1, wherein said chelated polyvalent metal comprises iron chelated with an alkaline glucoheptonate.

15. The process of claim 1, wherein said system comprises separate but contiguous reaction and oxygenation zones, said zones being in open fluid communication in a common vessel containing said liquid mixture, and said liquid mixture being recirculated between said zones by reason of the density difference between a higher density gas-free liquid mixture in said reaction zone and a lower density gas-containing liquid mixture in said oxygenation zone.

16. A continuous process for treating sour water with an aqueous catalyst solution of chelated iron to effect catalytic liquid phase oxidation of dissolved hydrogen sulfide to sulfur by means of dissolved oxygen, wherein said iron is reduced from its ferric state to its ferrous state during said oxidation of hydrogen sulfide, said process comprising:
provoding a recirculating system having a reaction zone for said oxidation of hydrogen sulfide and an interconnected oxygenation zone for introducing oxygen into said catalyst solution, each of said zones having an inlet and an outlet;
continuously recirculating between said reaction zone and said oxygenation zone a liquid mixture comprising a dilute aqueous catalyst solution containing a catalytic amount of chelated iron such that the liquid mixture has a predetermined iron content selected from the range of from about 0.5 ppm by weight to about 5 ppm by weight;
introducing sour water feed containing dissolved hydrogen sulfide adjacent said inlet of said reaction zone, and immediately mixing and diluting said sour water feed with a massive excess of oxygenated liquid mixture recirculated from said outlet of said oxygenation zone to said inlet of said reaction zone so as to maintain the molar ratio of dissolved oxygen plus one-half the ferric ion to sulfide ion in said liquid mixture in said reaction zone greater than about 1:1, said mixing and diluting being effected substantially entirely in liquid phase in said reaction zone so that said sour water feed is not contacted with air or gaseous oxygen or a stripping gas capable of stripping dissolved hydrogen sulfide from the liquid mixture until after the sour water has been diluted and has passed through said reaction zone;
introducing air or other oxygen-containing gas adjacent said inlet of said oxygenation zone, and contacting the air or other oxygen-containing gas with said liquid mixture recirculated from said outlet of said reaction zone under conditions effective to increase the dissolved oxygen content of said liquid mixture and also to oxidize the ferrous iron to its ferric state;
said zones being separate but contiguous and being in open fluid communication in a common vessel containing said liquid mixture, and said liquid mixture being recirculated between said zones by reason of the density difference between the higher density gas-free liquid mixture in said reaction zone and the lower density gas-containing liquid mixture in said oxygenation zone;
withdrawing through an overflow extending adjacent said outlet of said oxygenation zone a minor portion of the resultant oxygenated liquid mixture as the sweet water product of the process, substantially the balance of the oxygenated liquid mixture being recirculated from said oxygenation zone to said reaction zone;
introducing replacement chelated iron into the system adjacent said outlet from said oxygenation zone whereby said replacement chelated iron is rapidly mixed with said liquid mixture being recirculated from said oxygenation zone, the rate of introduction of said replacement chelated iron being sufficient to replace that removed in said sweet water product and to maintain said predetermined iron content in said liquid mixture;
regulating the sour water feed rate and the sweet water product withdrawal rate to provide a predetermined residence time of the sour water in the system selected from the range of from about 5 to about 120 minutes; and
correlating said predetermined residence time and said predetermined iron content so as to obtain a hydrogen sulfide removal efficiency of at least about 90%.

17. The process of claim 16, wherein the iron content of said liquid mixture is from about 1 ppm by weight to about 3 ppm by weight and said residence time is from about 15 to about 45 minutes.

* * * * *